United States Patent
Porter et al.

(10) Patent No.: US 9,162,387 B2
(45) Date of Patent: Oct. 20, 2015

(54) ASSEMBLY AND PROCESS FOR CREATING AN EXTRUDED PIPE FOR USE IN A GEOTHERMAL HEAT RECOVERY OPERATION

(71) Applicant: U.S. Farathane Corporation, Auburn Hills, MI (US)

(72) Inventors: Steve Porter, Romeo, MI (US); Kevin Weingartz, Imlay City, MI (US); Timothy John Brown, Washington, MI (US)

(73) Assignee: U.S. Farathane Corporation, Auburn Hills, MI (US)

( * ) Notice: Subject to any disclaimer, the term of this patent is extended or adjusted under 35 U.S.C. 154(b) by 432 days.

(21) Appl. No.: 13/726,771

(22) Filed: Dec. 26, 2012

(65) Prior Publication Data

US 2013/0181369 A1 Jul. 18, 2013

Related U.S. Application Data

(60) Provisional application No. 61/586,464, filed on Jan. 13, 2012.

(51) Int. Cl.
*B29C 47/28* (2006.01)
*F24J 3/08* (2006.01)
*B29C 47/00* (2006.01)
*B29C 47/88* (2006.01)
*B29C 47/04* (2006.01)
(Continued)

(52) U.S. Cl.
CPC .............. *B29C 47/0028* (2013.01); *B29C 47/04* (2013.01); *B29C 47/28* (2013.01); *B29C 47/8895* (2013.01); *F24J 3/083* (2013.01); *F24J 3/084* (2013.01); *B29C 47/003* (2013.01); *B29C 47/0064* (2013.01); *B29C 47/0066* (2013.01); *B29C 47/021* (2013.01); *B29C 47/1036* (2013.01); *B29C 47/92* (2013.01); *B29C 2947/92647* (2013.01); *F28F 21/062* (2013.01); *Y02E 10/125* (2013.01)

(58) Field of Classification Search
CPC .............. B29C 47/0052; B29C 47/005; B29C 47/0064; B29C 47/062; B29C 47/0028; B29C 47/28; B29C 47/901–47/905; F24J 3/082; F24J 3/083; F24J 3/084
See application file for complete search history.

(56) References Cited

U.S. PATENT DOCUMENTS 3,057,013 A * 10/1962 Loveless .................... 264/178 R
3,473,194 A * 10/1969 Farrow ............................ 425/71
(Continued)

FOREIGN PATENT DOCUMENTS

CH 658513 A5 * 11/1986
DE 19625114 A1 12/1997
(Continued)

*Primary Examiner* — William Bell
(74) *Attorney, Agent, or Firm* — Dinsmore & Shohl LLP; Douglas J. McEvoy

(57) ABSTRACT

The present invention discloses an assembly and process for creating a co-extruded pipe which includes the steps of extruding a first elongated component exhibiting an open interior. Additional process steps include co-extruding at least one, and typically a pair, of additional elongated components each having an arcuate or lobe cross sectional shape or profile. The additional components are bonded to exterior locations of the first component to establish a pair of additional open interiors between the components and prior to cooling and hardening.

6 Claims, 13 Drawing Sheets

(51) Int. Cl.
 *B29C 47/02* (2006.01)
 *B29C 47/10* (2006.01)
 *B29C 47/92* (2006.01)
 *F28F 21/06* (2006.01)

(56) References Cited

U.S. PATENT DOCUMENTS

| | | | |
|---|---|---|---|
| 3,928,903 A | | 12/1975 | Richardson et al. |
| 4,157,194 A | * | 6/1979 | Takahashi .................... 285/3 |
| 5,626,807 A | * | 5/1997 | O'Halloran ................... 264/148 |
| 6,620,354 B1 | * | 9/2003 | Bessemer et al. ............ 264/40.6 |
| 8,262,322 B2 | | 9/2012 | Desmeules |
| 2010/0180593 A1 | | 7/2010 | Schaller et al. |
| 2011/0011558 A1 | | 1/2011 | Dorrian et al. |
| 2011/0232795 A1 | * | 9/2011 | Hardin ........................ 138/111 |
| 2012/0125560 A1 | | 5/2012 | McKeown et al. |
| 2012/0186672 A1 | | 7/2012 | Fisenko et al. |
| 2012/0282032 A1 | | 11/2012 | Desmeules |
| 2012/0312016 A1 | | 12/2012 | Lawes |
| 2013/0101492 A1 | | 4/2013 | McAlister |

FOREIGN PATENT DOCUMENTS

| | | |
|---|---|---|
| EP | 2208954 A2 | 7/2010 |
| EP | 2385328 A2 * | 11/2011 |
| GB | 1154259 A * | 6/1969 |
| JP | 02-011218 | 1/1990 |

\* cited by examiner

ASSEMBLY AND PROCESS FOR CREATING AN EXTRUDED PIPE FOR USE IN A GEOTHERMAL HEAT RECOVERY OPERATION

CROSS REFERENCE TO RELATED APPLICATIONS

The present application claims the priority of U.S. Ser. No. 61/586,464 filed Jan. 13, 2012.

FIELD OF THE INVENTION

The present invention discloses a process for a sequential two stage extrusion process for creating an HDPE (high density polyethylene) pipe. The process includes the creation of a central sleeve shaped and grout receiving tube produced in an initial extrusion operation. A pair of outer lobes are produced in a secondary extrusion operation and are applied to exterior surface locations of the inner tube, in a semi-molten stage following the initial operation so as to be integrally formed therewith. Each of guide shape retention, cold-water immersion hardening, cutting and cross drilling steps are provided for creating a plurality of individual sections which are on site assembleable, such as utilizing hot plate welding technique. Additional top and bottom affixed caps are affixed to ends of the elongate assembled piping and, upon embedding the assembly within a ground location in interfacing fashion with a geothermal environment, provide for temperature alteration of the inner communicated fluid flow prior to delivery of the same to such as a suitable piece of heat expansion and energy transfer equipment, such as for creating electricity.

BACKGROUND OF THE RELEVANT ART

Geothermal heat recovery operations (also termed as a geothermal heat pump or ground source heat pump) are known in the art and which can provide for either of heating or cooling by pumping heat to or from a subterranean zone beneath a ground surface and by which the relevant assembly employed uses the earth as a heat source (in the winter) or a heat sink (in the summer). In application, geothermal systems are designed to take advantage of the moderate temperatures in the ground to boost efficiency and reduce the operational costs of heating and cooling systems. Ground source heat pumps are also known as "geothermal heat pumps" although, strictly, the heat does not come from the centre of the Earth, but from the Sun. They are also known by other names, including geoexchange, earth-coupled, earth energy systems.

Depending on latitude, the temperature beneath the upper 6 meters (20 ft) of Earth's surface maintains a nearly constant temperature between 10 and 16° C. (50 and 60° F.), if the temperature is undisturbed by the presence of a heat pump Like a refrigerator or air conditioner, these systems use a heat pump to force the transfer of heat from the ground. Heat pumps can transfer heat from a cool space to a warm space, against the natural direction of flow, or they can enhance the natural flow of heat from a warm area to a cool one.

The core of the heat pump is a loop of refrigerant pumped through a vapor-compression refrigeration cycle that moves heat. Seasonal variations drop off with depth and disappear below 7 meters (23 ft) due to thermal inertia. Like a cave, the shallow ground temperature is warmer than the air above during the winter and cooler than the air in the summer. A ground source heat pump extracts ground heat in the winter (for heating) and transfers heat back into the ground in the summer (for cooling). Some systems are designed to operate in one mode only, heating or cooling, depending on climate.

SUMMARY OF THE PRESENT INVENTION

The present invention discloses an assembly and process for creating a co-extruded pipe which includes the steps of extruding a first elongated component exhibiting an open interior. Additional process steps include co-extruding at least one second elongated component having an arcuate cross sectional profile, following which the second component is bonded to an exterior of the first component in order to establish a second open interior between the first and second components and prior to cooling and hardening.

The step of co-extruding further includes die forming first and second arcuate shaped lobes around a cylindrical shaped central sleeve. Other steps include linearly drawing and immersion cooling of the co-extruded pipe, as well as sectioning and stacking the pipe. Additional steps include cross forming apertures into the first component in non-interfering fashion with said second arcuate shaped components.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1A:
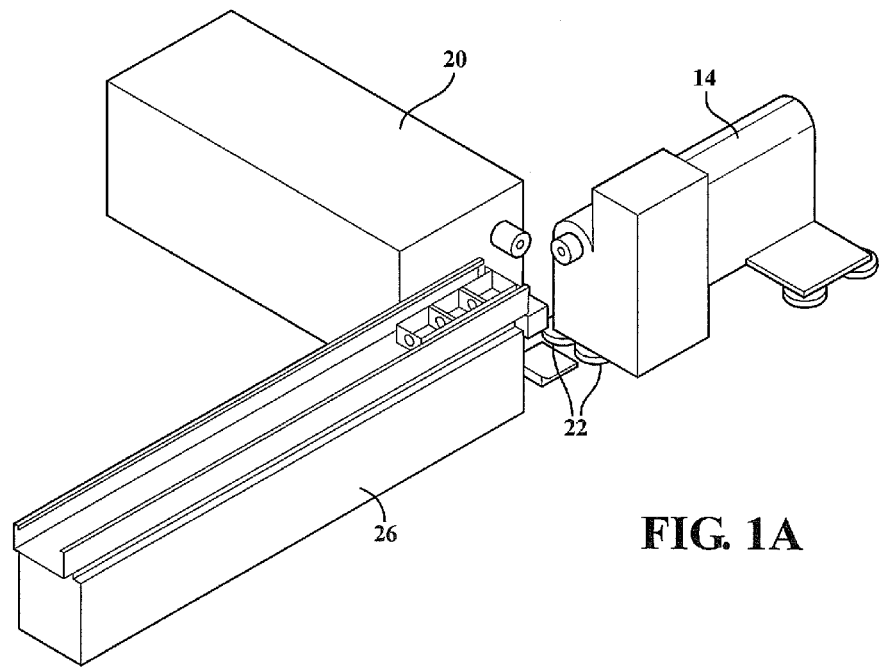
FIGS. 1A-1D are a series of schematic and line art drawings depicting the main and co-extrusion operations forming a portion of the overall process according to the present invention.
Figure 1B:
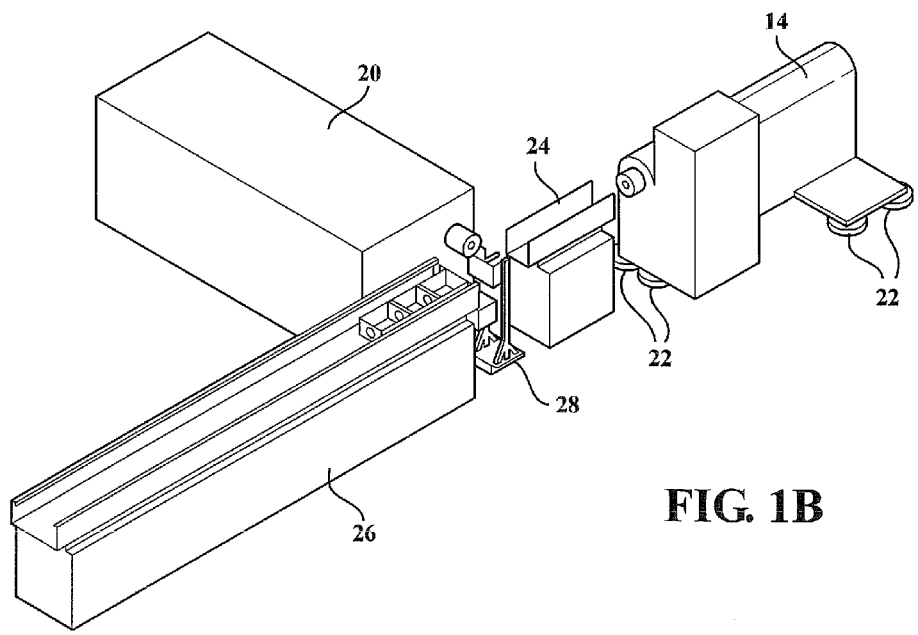
Figure 1C:
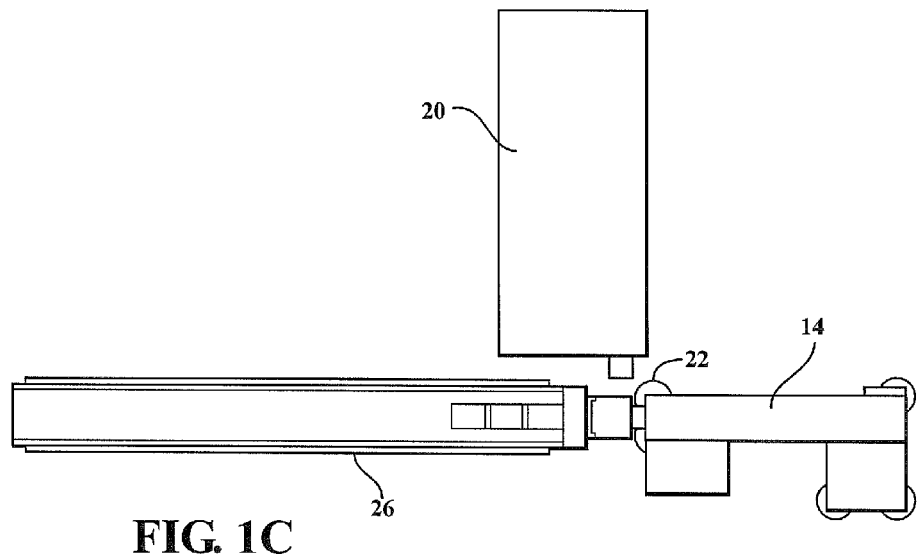
Figure 1D:
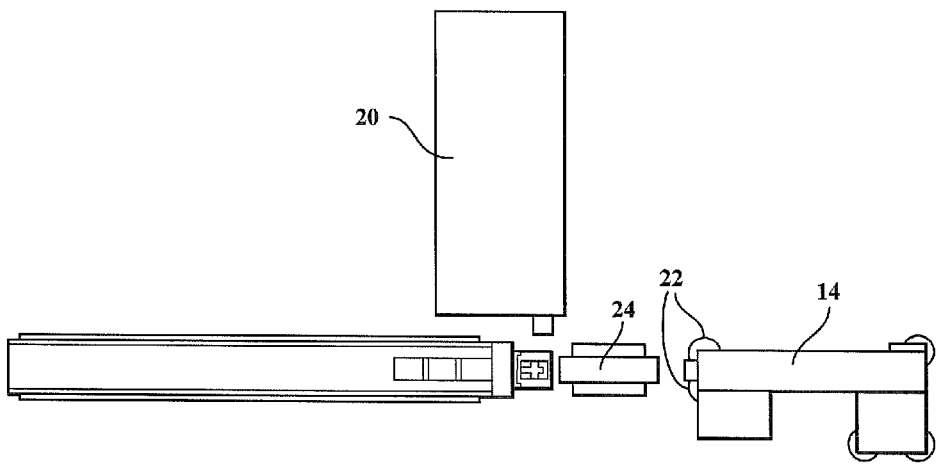
Figure 2:
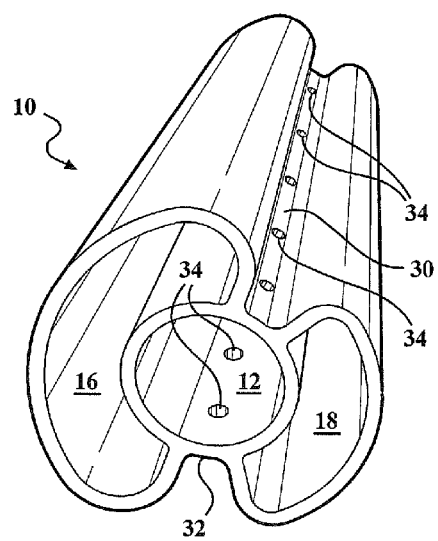
FIG. 2 is an end perspective illustration of an HDPE geothermal pipe produced according to the process.
Figure 3:
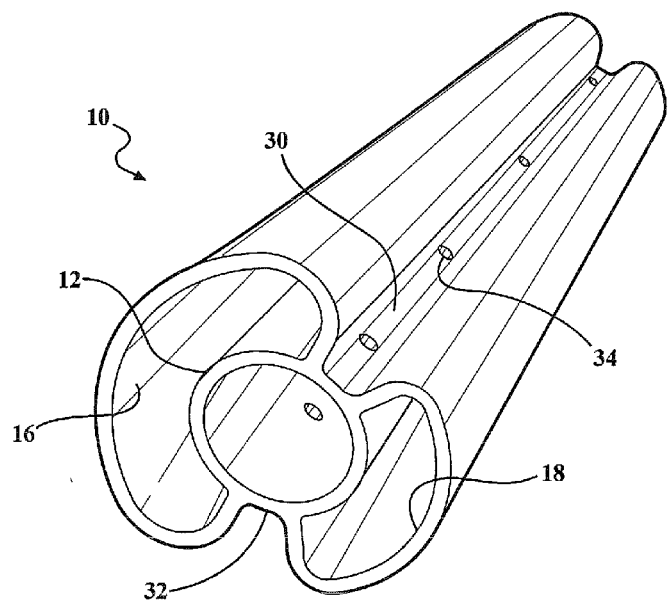
FIG. 3 is a further end perspective of the pipe shown in FIG. 2.
Figure 4:
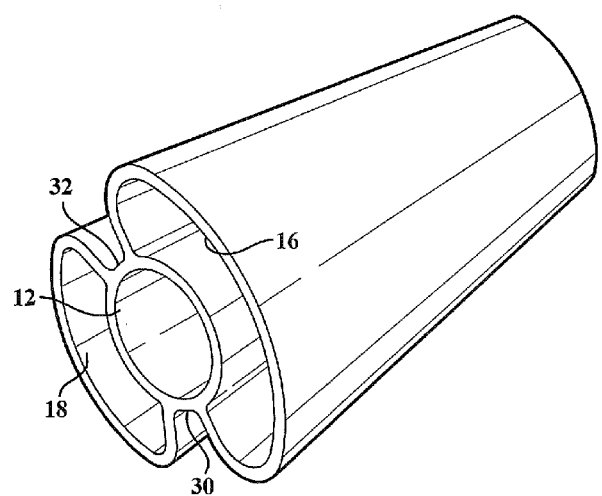
FIG. 4 is a rotated perspective of the pipe section depicted in FIG. 2 and better illustrating the configuration of the integrally formed larger (input) lobe as opposed to the smaller (output) lobe.
Figure 5:
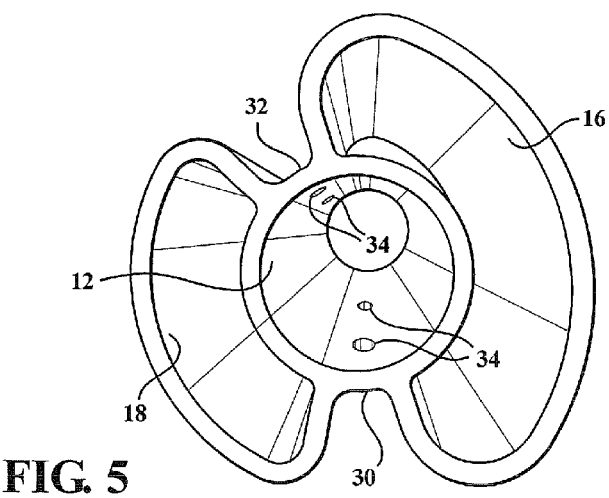
FIG. 5 is a further end view of the geothermal pipe in FIG. 2.

As previously described, the present invention discloses a process incorporating a sequential two stage extrusion process for creating such as a polymeric type pipe which can be utilized in a geothermal fluid flow application. In one non-limited application, an HDPE (high density polyethylene) material is employed (such as fed in pelletized form to in-feed hoppers associated with each of the main extruder and co-extrusion stations and in order to create the co-extruded pipe construction.

It is further envisioned that other material constructions can be employed in the co-extrusion process and in order to create a plurality of interconnecting pipe sections which are suitable for communicating a steady fluid (e.g. water, water based refrigerant or other suitable thermal conveying fluid) downwardly and successively upwardly along the running length of the embedded pipe and in order to take advantage of the geothermal gradient existing at certain locations for modifying a feed temperature of the fluid. In practice, the fluid is typically warmed (or cooled in the instance of a hot fed water input) to a general temperature range of 57° F., consistent with a typical geothermal gradient occurring within the earth crust and, upon being recovered from an outflow location of the uppermost pipe section, is usually fed into a fluid transfer/heat expansion mechanism for recovering a work output (e.g. electricity).

As will be further described throughout the succeeding illustrations, including an initial reference to FIGS. 2-5, the pipe co-extrusion (see generally at 10) created by the process includes the creation of a central sleeve shaped and grout receiving tube 12 produced in an initial (main) extrusion operation, see further at 14 in FIGS. 1A-1D. A pair of outer lobes (each of these including an arcuate formed and elongated layer applied to exterior locations of the central tube 12 are depicted by a first larger lobe 16 and a second smaller lobe 18) are produced in a secondary extrusion operation 20 (again FIGS. 1A-1D).

The sizing of the exterior lobes 16 and 18 is further such that the down/inflow lobe 16 exhibits a larger inner area in comparison to the up/outflow lobe 18, this in order to maintain desired directional fluid flow as well as to optimize the thermodynamics associated with the geothermal conditioned fluid delivered to the associated heat transfer (not shown) or other suitable output equipment mounted in fluidic communication with the outflow lobe 18.

Throughout the following description, explanation will be provided as to the manner in which the outer co-extruded lobes 16 and 18 are applied to exterior surface locations of the inner tube 12, such as existing in a semi-molten stage following the initial extrusion operation 14, and so that the co-extruded portions, upon being conjoined in a semi-molten state at a location along the co-extrusion line, are subsequently cooled to create an integrally formed pipe exhibiting high line bond strength. Each of guide shape retention, cold-water immersion hardening, cutting and cross drilling steps are also disclosed for creating a plurality of individual sections for ease of transport and on site assembly, such as utilizing hot plate welding technique. Additional top and bottom affixed caps (not shown) are affixed to ends of the elongate assembled piping and, upon embedding the assembly within a ground location in interfacing fashion with a geothermal environment, provide a communicating fluid flow both downward and return/upwardly with temperature alteration of the inner communicated fluid flow prior to delivery to such as a suitable piece of heat expansion and energy transfer equipment, not limited to that previously described in the background description and, in one application, such as specifically for creating electricity.

Referring again to FIGS. 1A-1D, illustrated are a series of schematic and line art drawings depicting the main (again at 14) and co-extrusion (at 20) operations forming a portion of the overall process according to the present invention. Additional components illustrated in schematic, and which will be described in further detail with reference to the succeeding operational views, are identified in FIG. 1B and include such as a plurality of air bearings 22 upon which the main extruder 14 is mounted.

Both the main extruder 14 and co-extruder 20 feed into a vacuum induced die chamber 24 (further reference being made to operational FIGS. 9-13) and prior to the combined extrusion being outputted to a linearly extending and elongated guiding/drawing subassembly 26 located in communication with an outlet of the co-extrusion die chamber. A removable crosshead die stand 28 (FIG. 1B) is further provided for assisting in supporting the co-extrusion of the outer lobes 16 and 18 in aligned and overlapping fashion relative the central sleeve 12.

Referring again to the completed extrusion views of FIGS. 2-6, and specifically when viewing from end cross section, a pair of recessed channels 30 and 32 are illustrated at generally offset circumferential locations of the central sleeve or tube, 12, as defined by the placement and configuration of the larger 16 (such as or water inflow) and smaller 18 (water outflow) lobes. As further shown, additional holes 34 are drilled or otherwise formed in linearly spaced fashion through the central tube 12 and in communication with the recessed channels 30 and 32, the purpose for which to permit outflow of a stabilizing grout or other suitable material initially introduced into the central sleeve to outflow through the holes 34 to fill the exterior facing recessed channels 30 and 32, such as once an assembled pipe is positioned within a ground location in communication with a suitable geothermal gradient.

Figure 6:
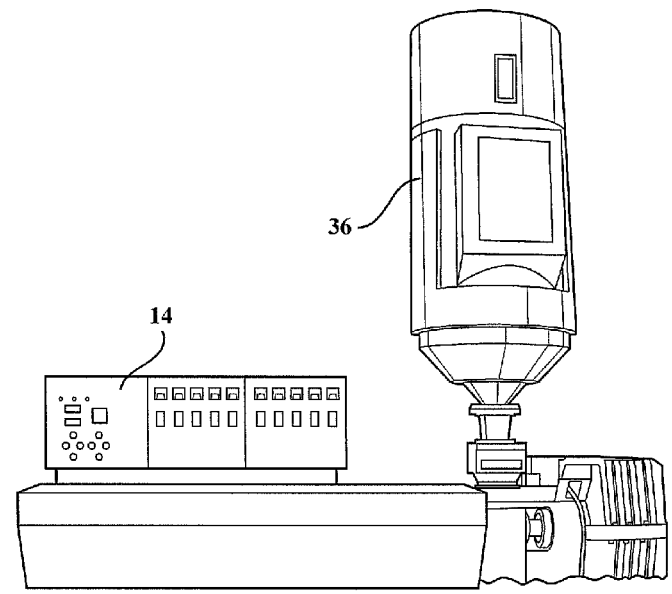
FIG. 6 is an illustration of an HDPE pellet infeed hopper associated with the main extruding operation.

Referring successively to each of FIGS. 6-21, a succession of operational views are depicted of one exemplary installation of a line process for creating the co-extruded geothermal pipe sections. FIG. 6 is an illustration of an HDPE pellet infeed hopper 36 associated with the main extruding operation 14. As further previously indicated, the material content of the extruded pipe is not limited to any specific recite, so long as it facilitates a suitable degree of conductive thermal transfer characteristics associated with its immersion in the thermal gradient environment and during throughflow of its inner fluid (water) medium.

Figure 7:
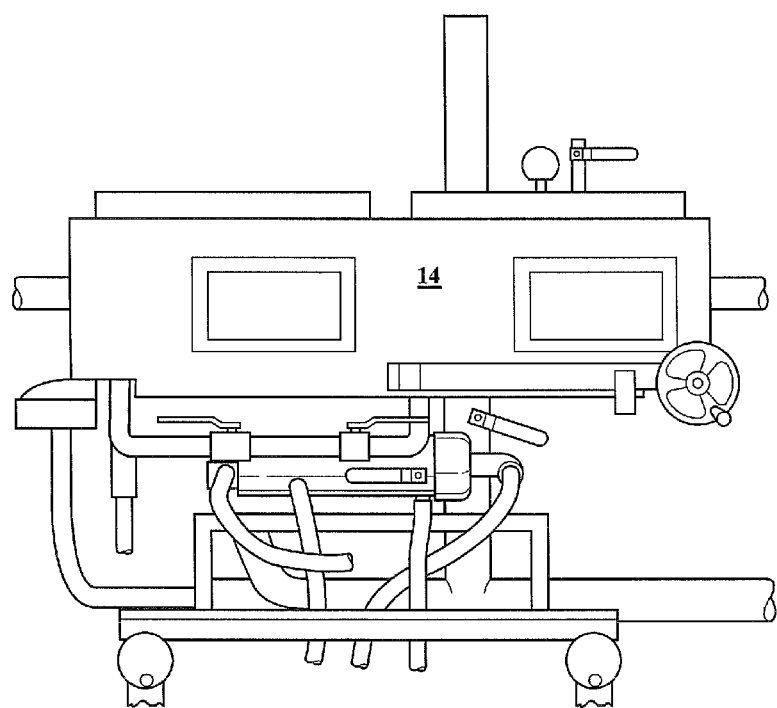
FIG. 7 is a further illustration of the first (main) stage extruder for creating the tubular configured inner sleeve.
Figure 8:
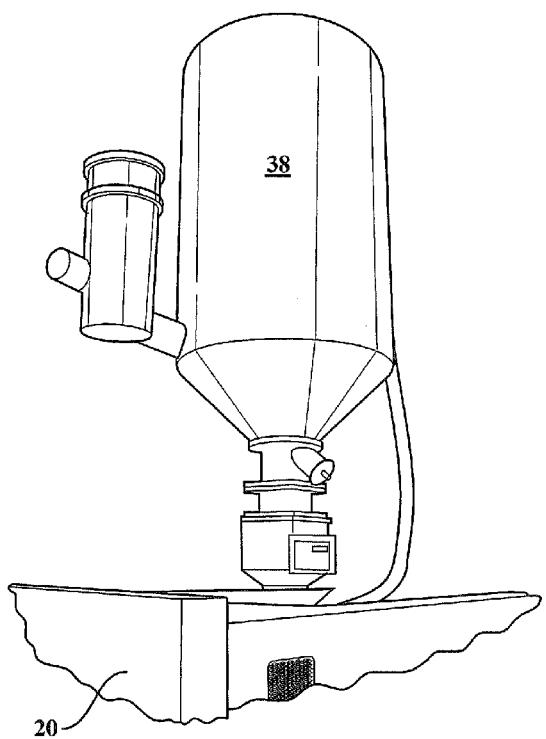
FIG. 8 is an illustration of a corresponding infill hopper associated with the second stage/cross extruder such as again feeding such as an HDPE material in pelletized form.

FIG. 7 is a further illustration of the first (main) stage extruder 14 for creating the tubular configured inner sleeve. FIG. 8 is an illustration of a corresponding infill hopper 38 associated with the second stage/cross extruder such as again feeding such as an HDPE material in pelletized form.

Figure 9:
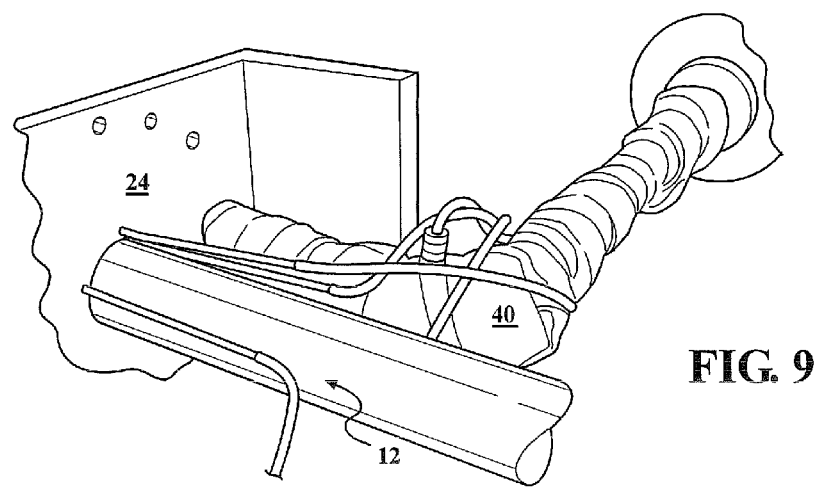
FIG. 9 is an illustration of a linear in-feed interface established between the first and second extrusion operations and which is utilized in order to overlappingly apply the secondary outer fluid flow lobe extrusions to the main central extruded tube.

Referring to FIG. 9, an illustration is provided of a linear in-feed interface established between the first and second extrusion operations and which is utilized in order to overlappingly apply the secondary outer fluid flow lobe 16 and 18 extrusions to the main central extruded tube 12. As shown, this includes the initially extruded and heated/semi-plasticized inner sleeve 12 being advanced in the manner depicted by the associated directional arrow into the vacuum/die chamber 24. A corresponding outflow line 40 represents the heated/molten and flowable HDPE material exiting the second/coextruder, the line 40 bending an approximately ninety degrees to infeed the co-extruder material into die 24 in proximity to the inlet fed inner sleeve 12.

Figure 10:
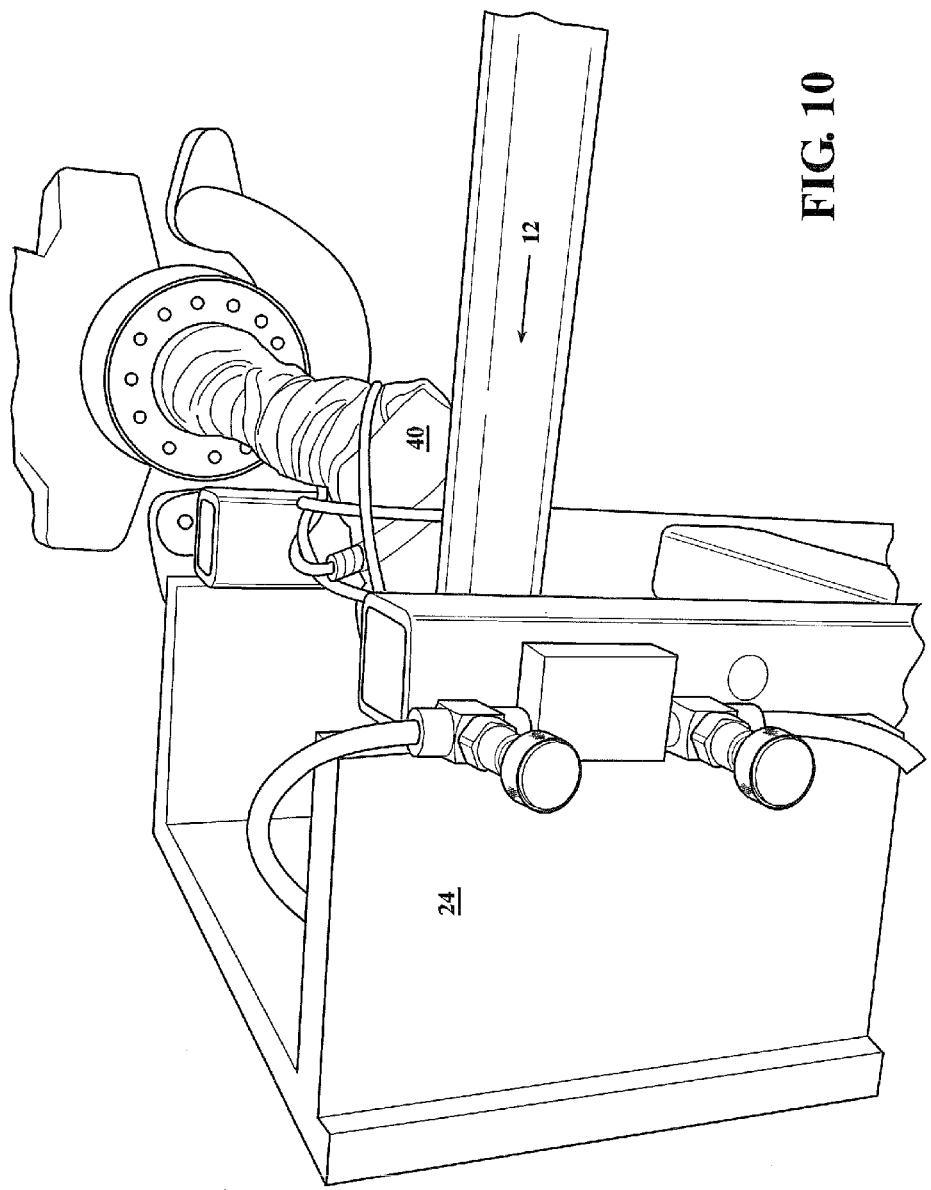
FIG. 10 illustrates an inlet to a die component for forming the overlapping lobes associated with the second extrusion operation to the semi-molten and extruded inner sleeve/tube.
Figure 11:
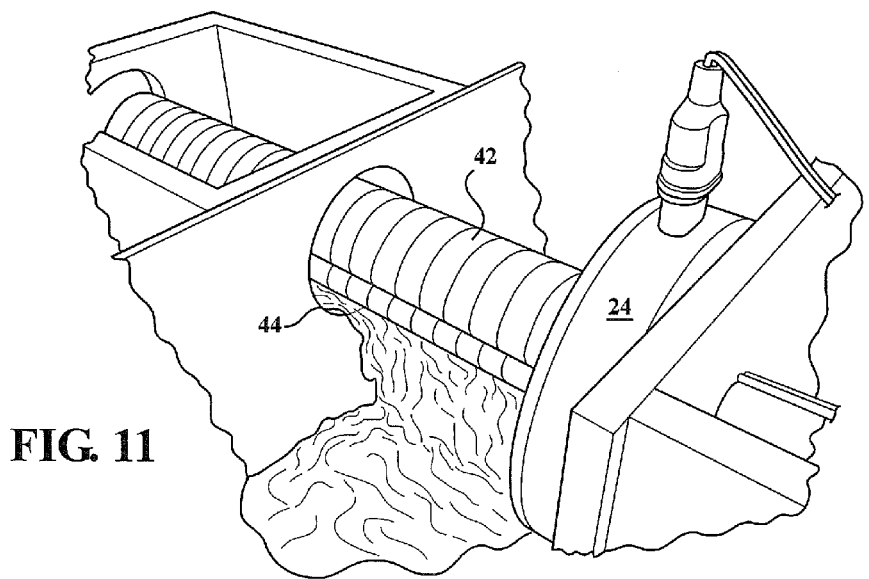
FIG. 11 is a better illustration of the lobe forming dies associated with the secondary extrusion operation.

FIG. 10 illustrates the inlet to the die component 24 from another vantage point and which can include suitable vacuum inducing fittings extending into the generally drum shaped enclosure of the die 24 for assisting in creating a desired profile during co-extruded forming the overlapping lobes 16 and 18 associated with the second extrusion operation to the semi-molten and extruded inner sleeve/tube 12. Proceeding to FIG. 11, a better illustration is shown of the lobe forming dies, see at 42 and 44, associated with the secondary extrusion operation and which are positioned in surrounding fashion relative to the inner linearly communicated sleeve 12.

Figure 12:
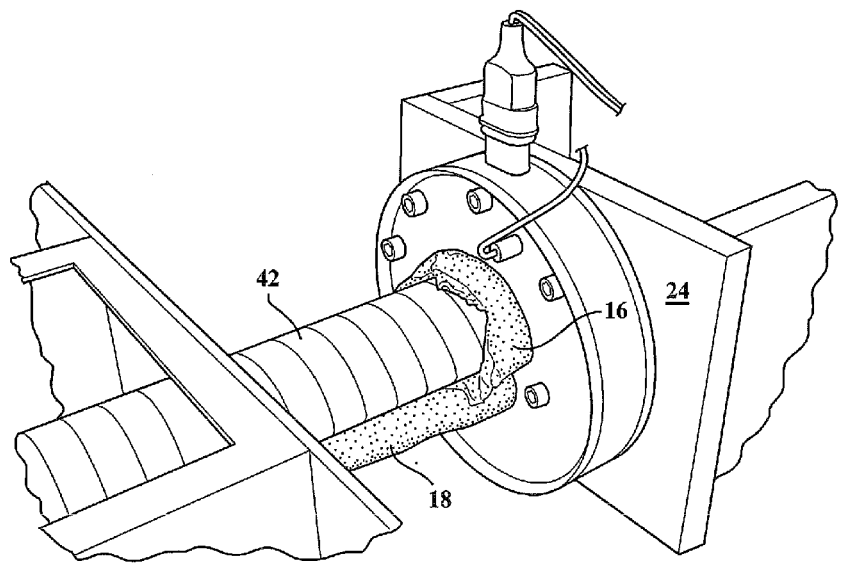
FIG. 12 illustrates initiation of overlapping extrusion of the outer lobes to the central tube.
Figure 13:
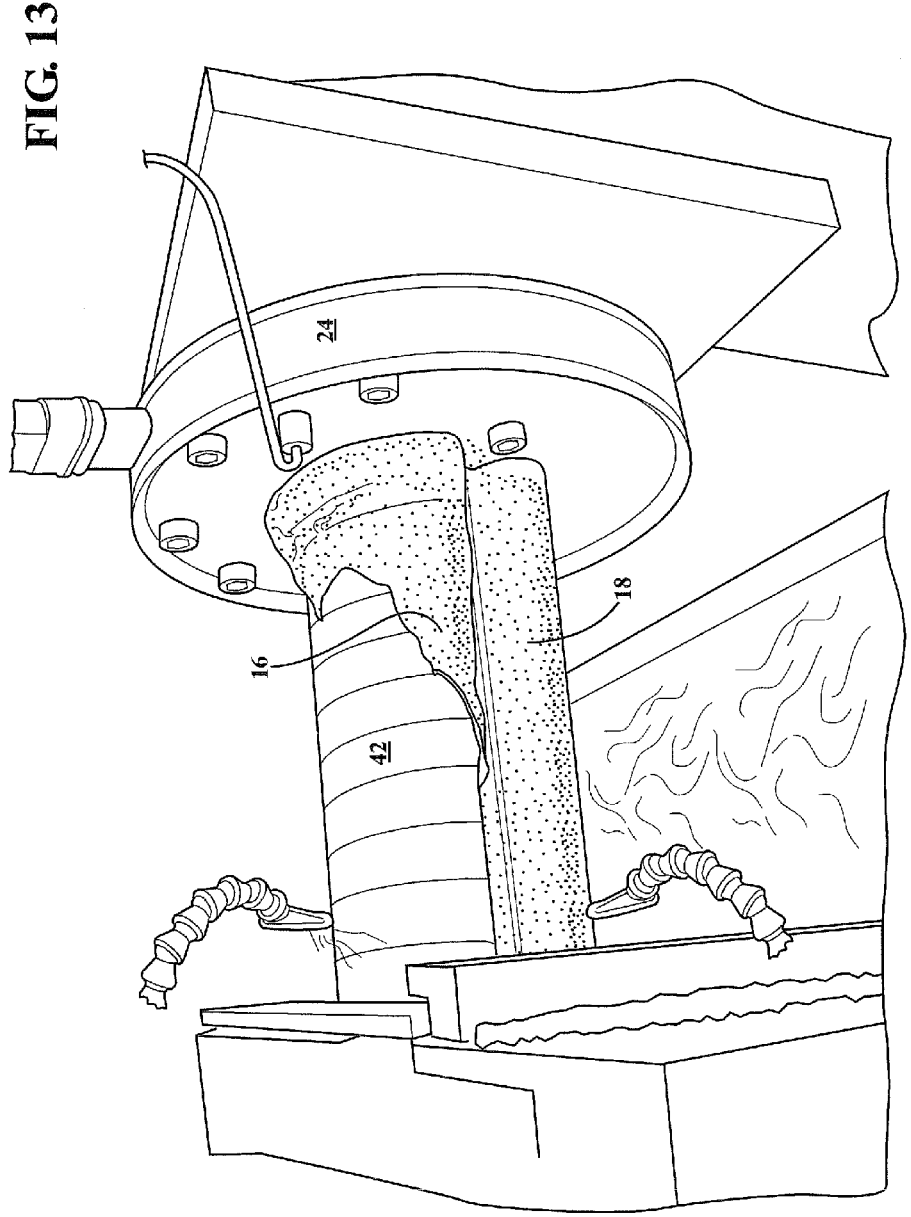
FIG. 13 is a succeeding view to that shown in FIG. 12 from a further perspective.

FIG. 12 illustrates, from a further vantage point, initiation of overlapping extrusion of the outer lobes 16 and 18 along the exterior of the central tube 12. FIG. 13 is a succeeding view to that shown in FIG. 12 from a further perspective and which further evidences a high degree of wall/lobe thickness control associated with both the inner sleeve 12 and outer lobes 16 and 18, this in order to maintain (or modify), along with the selected HDPE or other material content, desired heat transfer characteristics.

Figure 14:
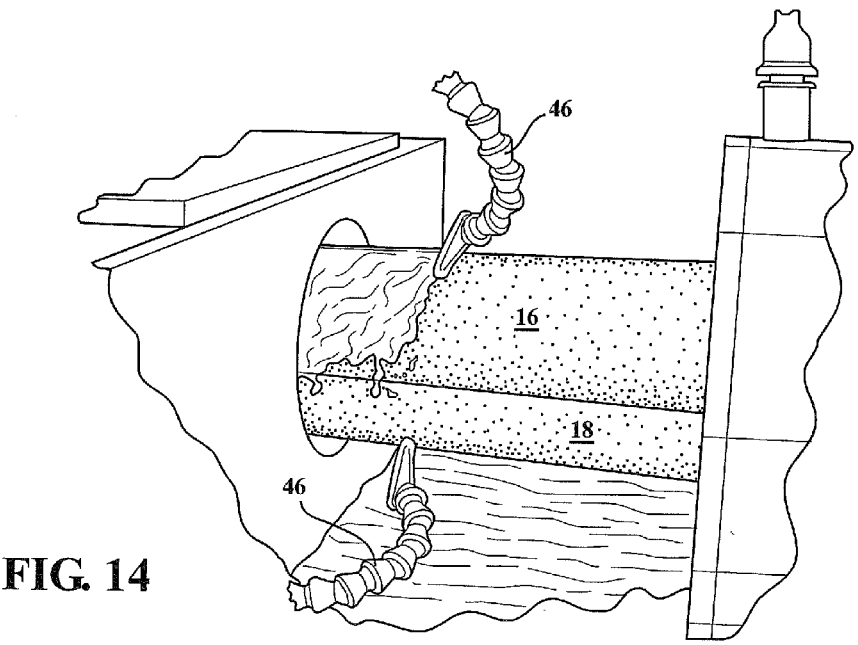
FIG. 14 is a water cooling operation associated with the cross extrusion operations for assisting in establishing quick line bonding between the heated central tube and outer applied lobes.

FIG. 14 illustrates a water cooling operation, see flex-adjustable fluid lines 46 opposing both the larger 16 and smaller 18 co-extruded lobes and including spray directed nozzles for directing external cooling water onto the cross extrusion operations, assisting in establishing quick line bonding between the rapidly cooling central tube 12 and outer applied lobes and from a molten/plasticized state to cooled/hardened state in which the materials mechanically interface and bond.

Figure 15:
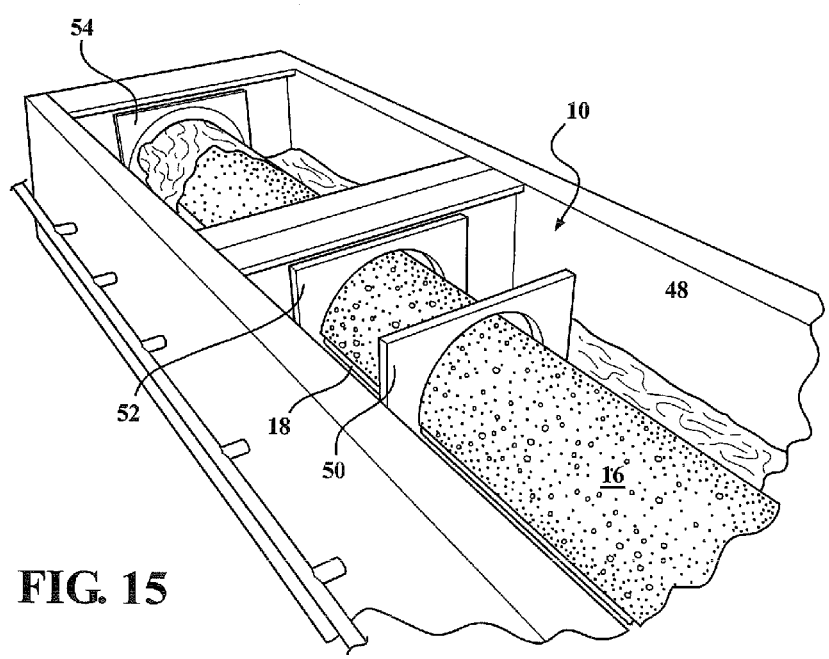
FIG. 15 illustrate a series of line plates associated with a downstream station from the co-extrusion operation and which assists in maintaining a consistent exterior profile of the outer extruded lobes.

Proceeding to FIG. 15, a linear extending and cooling fluid immersion tank 48 is depicted and which illustrates a series of spaced apart and open interior line plates 50, 52, 54, et seq. associated with a downstream station from the co-extrusion operation. The arrangement and positioning of the plates is such that they assist in maintaining a consistent, and straightened, exterior profile of the outer extruded lobes 16 and 18 during a linear drawing/pulling operation for continuously moving the co-extruded article during rapid cooling/hardening of the same.

Figure 16:
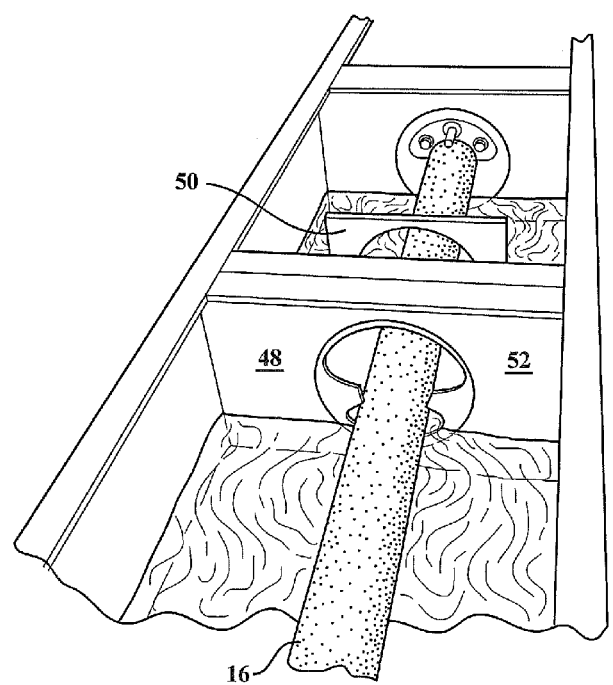
FIG. 16 is a rotated illustration of FIG. 15 and better depicting the linear drawing aspect of the co-extruded pipe which is translated in a fashion for maintaining its desired profile shape and integrity.
Figure 17:
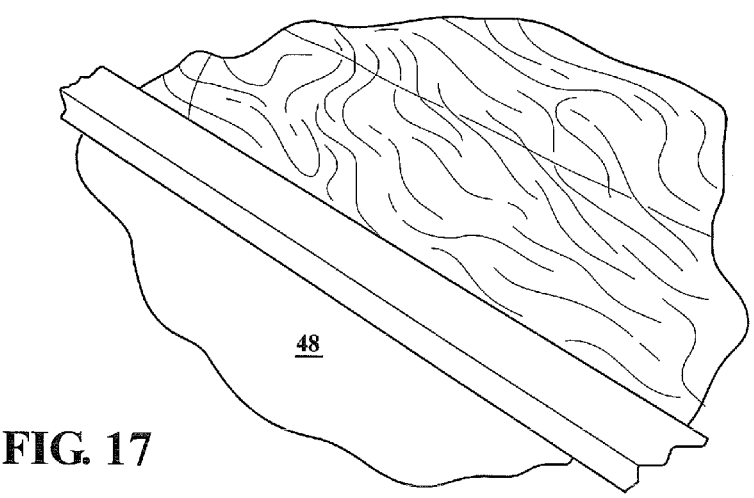
FIG. 17 is a succeeding cold water immersion station associated with line process and for assisting in rapid cooling of the co-extruded pipe.

FIG. 16 is a rotated illustration of FIG. 15 and better depicting the linear drawing aspect of the co-extruded pipe which is translated in a fashion for maintaining its desired profile shape and integrity. FIGS. 16 and 17 successively illustrate cold water immersion station 48 associated with line process and for assisting in rapid cooling of the co-extruded pipe shaped article.

Figure 18:
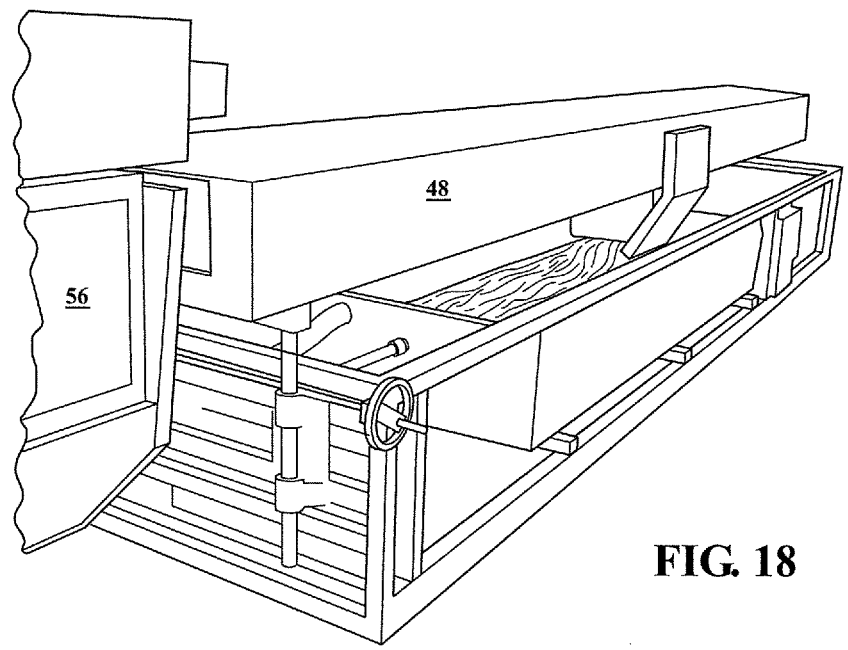
FIG. 18 is a rotated view of the guided/cold immersion/drawing stations illustrated in FIGS. 15-17 from a downstream looking end and prior to a pipe sectioning station.
Figure 19:
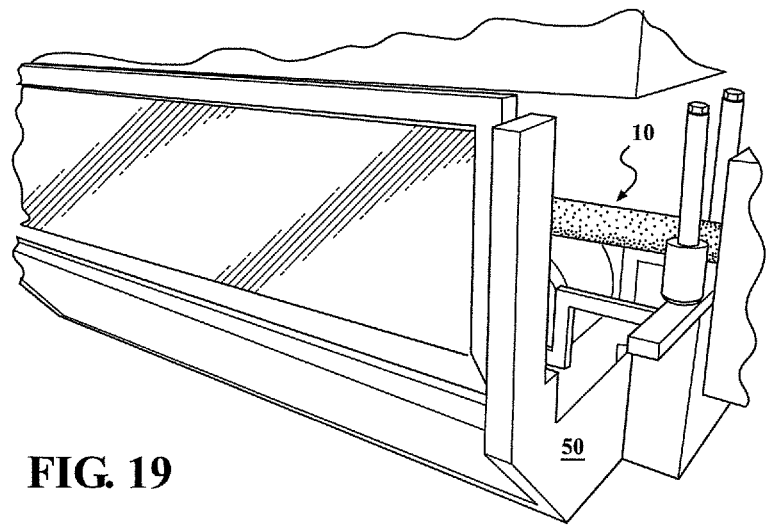
FIG. 19 is a further illustration of the pipe sectioning operation for cutting the extruded pipes to specified running lengths.

FIG. 18 is a rotated view of the guided/cold immersion/drawing stations, collectively again referenced by elongated and fluid bath immersing disclosure 48, illustrated in FIGS. 15-17, and from a downstream looking end and prior to a pipe sectioning station 56. FIG. 19 is a further illustration of the pipe sectioning operation, again generally depicted at 56, for cutting the extruded pipes to specified running lengths which facilitate ease of stacking and transport (such as in one non-limiting range including individual 20' running lengths).

Figure 20:
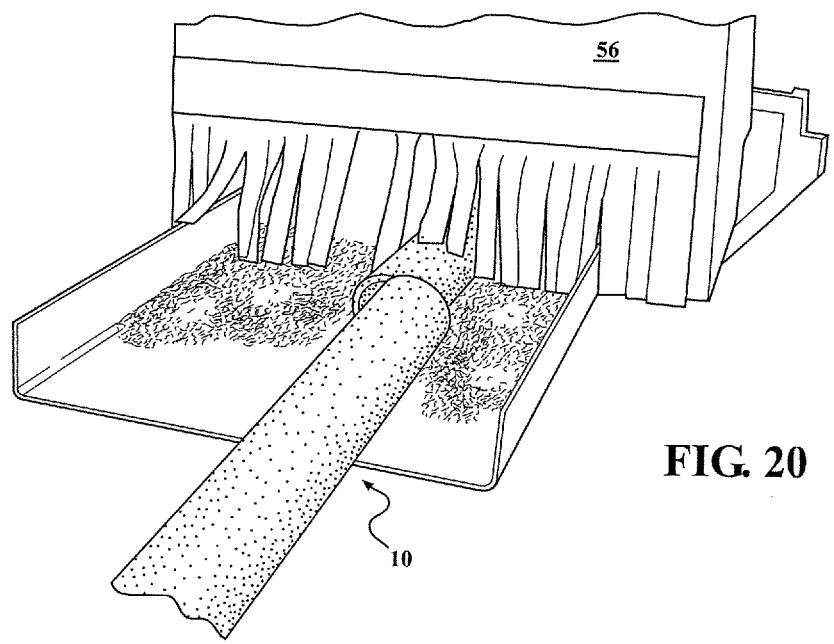
FIG. 20 is a downstream location of the pipe sectioning station and in which the individual sectioned lengths of pipe are transferred/stacked for transport.
Figure 21:
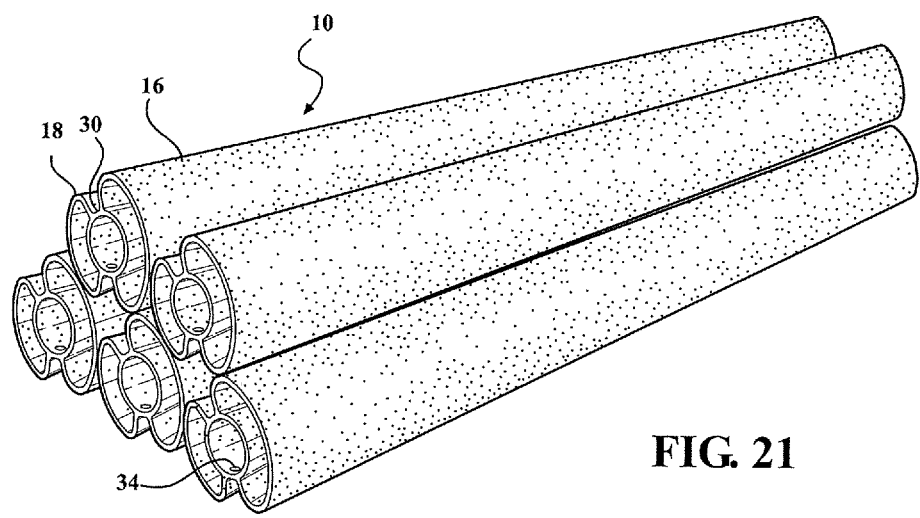
FIG. 21 is an illustration of a stacked plurality of co-extruded HDPE pipes formed according to the present invention and including a plurality of access holes formed into the recessed side channels of the pipe for facilitating outflow of grout through the central tube and in order to provide additional positional stability during in-ground installation.

FIG. 20 is a downstream location of the pipe sectioning station 56 and in which the individual sectioned lengths of pipe are transferred/stacked for transport. Finally, FIG. 21 is an illustration of a stacked plurality of co-extruded HDPE pipes formed according to the present invention and, similarly to the selected pipe sectioned views of FIGS. 2-5, exhibiting a selected pipe 10 with access holes 34 formed into its recessed side channels (see again as at 30) of the pipe for again facilitating outflow of grout through the central tube and in order to provide additional positional stability during in-ground installation. Although not shown, it is understood that the line process described herein can be further modified in order to form the pluralities of cross wise apertures 34 along the recessed sides of the co-extruded pipe in a downstream operation, such as during the sectioning of the pipe into equal lengths.

Having described our invention, other and additional preferred embodiments will become apparent to those skilled in the art to which it pertains, and without deviating from the scope of the appended claims. This can include such as combining the dies and patterns for creating the outer arcuate lobes 16 and 18 into a single co-extruded die component, as well as producing a co-extruded article in which the dies are reconfigured for producing a single lobe or other multiple numbers of lobes around the central and initially extruded sleeve.

We claim:

1. An assembly for producing a co-extruded pipe, comprising:
   a main extruder for forming a single walled pipe;
   a coextruder including a cross head die communicating with an outlet of said main extruder and through which is communicated the single walled pipe;
   an outlet side of said cross head die including lobe forming portions between which is communicated the single walled pipe, material from said coextruder flowing across said lobe forming portions and bonding to the single walled pipe at displaced circumferential locations so that the lobes do not contact one another and reveal first and second exposed portions of the single walled pipe;
   a cooling tank through which the co-extruded pipe is communicated combined with a linear drawing/pulling station for continuously drawing the co-extruded pipe during cooling and hardening;
   a pipe sectioning operation communicating with an outlet of said pulling station for cutting the co-extruded pipe to specified running lengths; and
   a station for aperturing the exposed portions of the single walled pipe to permit outflow of stabilizing material poured into the pipe during in-ground installation.

2. The assembly as described in claim 1, further comprising a pellet infeed hopper associated with said main extruder.

3. The assembly as described in claim 1, said said cross head die further comprising a linear in-feed interface established between said main extruder and co-extruder for overlapping the outer lobes extrusions to the single walled pipe.

4. The assembly as described in claim 1, said cross head die further comprising a die chamber, an inlet to said die chamber having fittings extending into a drum shaped enclosure for assisting in creating a desired profile during co-extruded forming of the overlapping lobes produced by the second extrusion operation to the semi-molten and extruded single walled pipe produced by the main extruder.

5. The assembly as described in claim 4, further comprising a water cooling operation provided by flex-adjustable fluid lines opposing both the co-extruded lobes and including spray directed nozzles for directing external cooling water onto the cross extrusion operations for assisting in quick line bonding between the rapidly cooling single walled pipe and outer co-extruded lobes and from a molten/plasticized state to cooled/hardened state in which the materials mechanically interface and bond.

6. The assembly as described in claim 5, further comprising a linear extending and cooling fluid immersion tank downstream from said spray nozzles, said immersion tank having a series of spaced apart and open interior line plates associated with a downstream station from the co-extrusion operation for assisting in maintaining a consistent and straightened exterior profile of the outer extruded lobes during the linear drawing/pulling operation and for continuously moving the co-extruded article during rapid cooling/hardening of the same.

\* \* \* \* \*